United States Patent
Komer et al.

(10) Patent No.: US 7,881,832 B2
(45) Date of Patent: *Feb. 1, 2011

(54) AUTOMATIC SPEECH RECOGNITION SYSTEM AND METHOD FOR AIRCRAFT

(75) Inventors: Joseph L. Komer, Lenexa, KS (US); Joseph E. Gepner, Olathe, KS (US); Charles Gregory Sherwood, Olathe, KS (US)

(73) Assignee: Garmin International, Inc., Olathe, KS (US)

(*) Notice: Subject to any disclaimer, the term of this patent is extended or adjusted under 35 U.S.C. 154(b) by 970 days.

This patent is subject to a terminal disclaimer.

(21) Appl. No.: 11/457,392

(22) Filed: Jul. 13, 2006

(65) Prior Publication Data

US 2010/0030400 A1  Feb. 4, 2010

Related U.S. Application Data

(63) Continuation-in-part of application No. 11/423,316, filed on Jun. 9, 2006.

(51) Int. Cl.
G01C 23/00 (2006.01)

(52) U.S. Cl. .................... 701/3; 701/9; 701/11; 701/36; 244/222

(58) Field of Classification Search ............... 701/3–14, 701/36; 244/75.1, 220–222
See application file for complete search history.

(56) References Cited

U.S. PATENT DOCUMENTS

| | | | |
|---|---|---|---|
| 6,163,768 A | 12/2000 | Sherwood et al. ........... 704/235 |
| 6,720,890 B1 | 4/2004 | Ezroni et al. | |
| 6,895,380 B2 | 5/2005 | Sepe, Jr. ..................... 704/275 |
| 7,006,013 B2 | 2/2006 | Mitchell et al. | |
| 7,089,108 B2 | 8/2006 | Merritt ....................... 701/206 |
| 7,103,460 B1* | 9/2006 | Breed ........................... 701/29 |
| 7,148,760 B2* | 12/2006 | Vaananen .................... 331/25 |
| 7,415,326 B2 | 8/2008 | Komer et al. ................. 701/3 |
| 7,555,730 B2* | 6/2009 | Atkins ........................ 715/853 |
| 7,630,710 B2* | 12/2009 | Kauffman ................... 455/431 |
| 2001/0030611 A1 | 10/2001 | O'Rourke | |
| 2002/0107694 A1 | 8/2002 | Lerg | |
| 2003/0025682 A1 | 2/2003 | Dame | |
| 2004/0006412 A1 | 1/2004 | Doose et al. | |
| 2004/0124998 A1 | 7/2004 | Dame | |
| 2005/0203700 A1 | 9/2005 | Merritt | |
| 2006/0015338 A1 | 1/2006 | Poussin | |
| 2007/0288128 A1 | 12/2007 | Komer et al. ................. 701/3 |

OTHER PUBLICATIONS

Scansoft User Manual, published 2004, p. 24.

* cited by examiner

Primary Examiner—Richard M. Camby
(74) Attorney, Agent, or Firm—Samuel M. Korie

(57) ABSTRACT

A system and method which implement automatic speech recognition (ASR) and text-to-speech (TTS) programs to permit pilots, co-pilots, and other persons to more quickly and easily perform control and monitoring tasks on aircraft. The system may be used to automatically change the frequency of an aircraft radio when a pilot or co-pilot is instructed to do so by ATC.

20 Claims, 2 Drawing Sheets

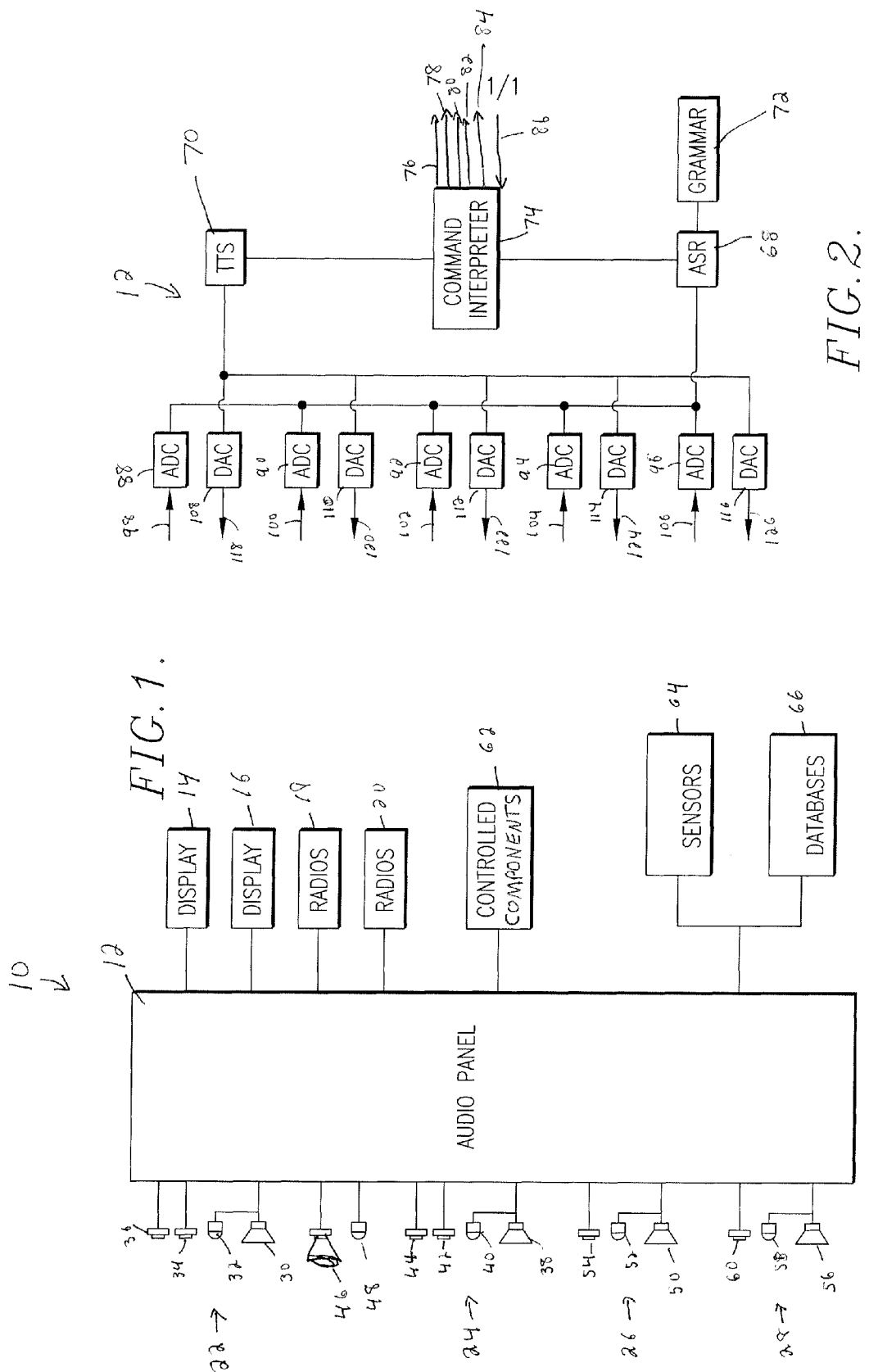

AUTOMATIC SPEECH RECOGNITION SYSTEM AND METHOD FOR AIRCRAFT

RELATED APPLICATIONS

The present application is a Continuation-In-Part of and claims priority benefit of co-pending, commonly assigned U.S. patent application entitled "AUTOMATIC SPEECH RECOGNITION SYSTEM AND METHOD FOR AIRCRAFT", Ser. No. 11/423,316 filed Jun. 9, 2006, incorporated herein by specific reference.

FIELD OF THE INVENTION

The present invention relates to avionics systems. More particularly, the invention relates to a system and method which implement automatic speech recognition and text-to-speech programs to assist pilots and co-pilots in monitoring the status of and controlling the operation of aircraft.

BACKGROUND

Pilots and co-pilots are required to monitor a myriad of communication channels, sensors, and gauges and perform numerous control functions while operating aircraft. Such monitoring and control functions are becoming increasingly more difficult and critical as the complexities of aircraft increase. Avionics systems have been developed to automate some of the operational and monitoring requirements of aircraft; however, pilots and co-pilots still must manually monitor and operate most aspects of their aircraft.

Accordingly, there is a need for an improved avionics system that overcomes the limitations of the prior art. More particularly, there is a need for a system and method which reduces the amount of time pilots and co-pilots spend on monitoring and control functions so they can concentrate on other required tasks.

SUMMARY OF THE INVENTION

The present invention solves the above-described problems and provides a distinct advance in the art of avionics systems. More particularly, the present invention provides a system and method which implement automatic speech recognition (ASR) and text-to-speech (TTS) programs to permit pilots, co-pilots, and other persons to more quickly and easily perform control and monitoring tasks on aircraft.

The present invention is preferably implemented with an ASR program and TTS program which are integrated into an avionics system such as the G1000 integrated avionics system provided by Garmin International, Inc. The ASR and TTS programs may be incorporated into an audio panel or other component of the G1000 integrated avionics system or any other avionics system. Alternatively, the ASR and TTS programs may be implemented in a stand-alone piece of avionics equipment which interfaces with an avionics system such as the Garmin G1000.

In one embodiment, the system of the present invention may be used to automatically control a function of an aircraft in response to a pilot's or co-pilot's confirmation of instructions from an external source such as air traffic control (ATC). For example, the system may be used to automatically change the frequency of an aircraft radio when a pilot or co-pilot is instructed to do so by ATC. When ATC assigns communication frequencies, pilots or co-pilots commonly read back the frequency assignments to ensure accurate communication. In an inbound radio communication to the aircraft, ATC may say something like, "N123 change to Kansas City Center on 123.45." The pilot or co-pilot responds by pushing a push-to-talk (PTT) switch and then saying, in an outbound radio communication from the aircraft, "Changing to 123.45, N123." With the present invention, pressing the PTT, or any other button or triggering device, triggers the ASR to begin monitoring the outbound communication. Once the PTT is released, the ASR analyzes the pilot's or co-pilot's response to recognize words or phrases which may correspond to a control function of the aircraft such as changing the radio frequency. In the example above, the ASR recognizes the pilot's or co-pilot's confirmation as a request to change a COM 1 radio to a frequency of 123.45. A command interpreter may then automatically change the frequency of the appropriate radio without requiring the pilot or co-pilot to take any further action. This allows the system to control a function of the aircraft without requiring any further action beyond responding to ATC, as the pilot or co-pilot normally would. This reduces pilot workload.

Alternatively, the system of the present invention may also provide confirmation by displaying something like "Change COM 1 to 123.45?" on a display or using the TTS program to convert this confirmation to speech. The pilot or co-pilot then acknowledges the change of frequency by operating a push-to-control (PTC) button, such as the PTT switch or other device, and/or by saying, "Confirm" or another similar word which is then recognized by the ASR. Once the pilot or co-pilot has acknowledged the change of frequency, the system of the present invention automatically changes the frequency of COM 1 without requiring further action from the pilot or co-pilot. The system may be used in a similar manner to automatically change the heading, altitude, air speed, or any other controllable aspect of the aircraft.

The system of the present invention can also be used by multiple people on the same aircraft. For example, the system may monitor selected communications from pilots, co-pilots, attendants and passengers and comply with certain requests from a pilot or co-pilot and different or more limited requests from passengers and/or attendants. The system also prioritizes communications so that, for example, commands from pilots take precedence over simultaneous and/or conflicting commands from passengers. The system may also prioritize the level of confirmation required before a requested function is performed so that for example, highly critical functions (lower landing gear) require at least one confirmation, whereas non-critical functions (change an entertainment option) require no confirmation.

In another embodiment, the system of the present invention may be used to automatically control a function of an aircraft by combining ASR commands and information about the state of the aircraft and/or other information stored in a database. For example, the system may be used to automatically tune an aircraft radio based on a pilot's or co-pilot's command and the current position of the aircraft. While an aircraft is on the ground, pilots often monitor weather and airport conditions on an ATIS frequency, then attempt to gain IFR clearance on a clearance frequency, then obtain taxi instructions from a ground frequency, and then finally obtain takeoff permission on a tower frequency. Instead of looking up the numeric frequencies for each of these channels for the current airport and then manually switching between the channels, the present invention permits a pilot or co-pilot to merely issue a voice command to automatically tune to a particular frequency. The pilot or co-pilot may push the PTC switch and say something like, "Tune tower". Pressing the PTC, or any other button or triggering device, triggers the ASR to begin monitoring the pilot's or co-pilot's commands. Once the PTC is released, the ASR attempts to recognize words or phrases of the pilot's or co-pilot's command which may correspond to a control function of the aircraft such as changing the radio frequency. In the example above, the ASR recognizes the pilot's or co-pilot's request to tune a communication radio to the airport tower. The system then automatically looks up the tower frequency for the current airport based on the current position of the aircraft as determined by a Global Positioning Satellite (GPS) receiver or other source of position information such as inertial navigation coupled with or incorporated in the avionics system and automatically tunes a communication radio to the relevant tower frequency.

The system may also provide confirmation by displaying something like "Tune to tower at XYZ airport?" on a display or using the TTS program to convert this confirmation to speech. The pilot or co-pilot then acknowledges the change of frequency by operating the PTC button or other device or by saying, "Confirm" or another similar word which is recognized by the ASR. Once the pilot or co-pilot has acknowledged the change of frequency, the system automatically changes the frequency to the appropriate tower frequency. The system may be used in a similar manner to automatically navigate the aircraft to the nearest airport, find the nearest fuel stop, find the closest airport with a rental car, determine the best altitude based on wind speed, or determine the closest obstacle based on information sensed by a sensor or provided by a database.

In another embodiment, the system of the present invention may be used by a pilot or co-pilot to more quickly and easily check the status of an aircraft by combining ASR commands and TTS readbacks. For example, the system may be used to automatically retrieve a checklist, read-off items from the checklist, and then receive confirmation that functions have been performed in accordance with the checklist. A pilot or co-pilot will often read off items on a checklist while the other performs certain operations in accordance with the checklist and then confirms that the items have been performed. The system of the present invention may be used to partially automate this process. The pilot or co-pilot may push the PTC switch or other switch and say something like, "Pre-flight checklist". Pressing and then releasing the PTC triggers the ASR to attempt to recognize the pilot's or co-pilot's request for a pre-flight checklist. Once recognized, the system automatically retrieves the pre-flight checklist and then reads off items on the checklist with the TTS and/or displays the items on a display. After each item in the checklist is read-off or displayed, the pilot or co-pilot responds by saying something like, "Check". The ASR recognizes the confirmation and then displays or reads off the next item in the checklist.

Before reading off or displaying the requested checklist, the system may also ask for confirmation by displaying or reading off something like, "Pre-flight checklist?" The pilot or co-pilot acknowledges that the proper checklist was retrieved by operating the PTC button or by saying, "Confirm". The system of the present invention may also dynamically alter the contents of a checklist based on the current state of the aircraft or another sensed parameter. For example, if a pre-landing checklist is requested and retrieved, and the checklist requires the pilot or co-pilot to lower an aircraft's landing gear, the system may first sense the current air speed of the aircraft and instruct the pilot or co-pilot to reduce the air speed to an acceptable level before lowering the landing gear.

In another embodiment, the system of the present invention may be used to call-out requested data or other information to a pilot or co-pilot. For example, rather than manually determining the closest airport based on the current position and heading of an aircraft, a pilot or co-pilot can simply push the PTC switch or other control device and say something like, "Find nearest airport". Pressing and releasing the PTC triggers the ASR to recognize the command and trigger the system to find the closest airport based on sensed information such as the current position, heading, and altitude of the aircraft. The system then displays the name of, coordinates of, and/or the heading to the closest airport and/or provides this information audibly with the TTS. The system may be used in a similar manner to quickly and easily provide other information to the pilot or co-pilot such as the position, heading, altitude, and speed of the aircraft as well as weather conditions currently experienced by the aircraft or weather conditions at a selected destination of the aircraft.

In another embodiment, the system of the present invention may be used to alert a pilot or co-pilot of relevant communications. Aircraft radios are often tuned to frequencies which are simultaneously used by multiple aircraft at an airport. The pilot or co-pilot of an aircraft must listen to all of the communications and then respond or comply with instructions that are relevant to his or her particular aircraft. The system of the present invention monitors inbound communications to the aircraft and then attempts to recognize portions of the inbound communications that identify the aircraft. For example, the system may monitor communications from a tower and then recognize the aircraft's tail number in a communication. Once the tail number is recognized, the system alerts the pilot or co-pilot with an audible, textual or speech prompt.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a schematic diagram of selected components of an avionics system in which the system of the present invention may be incorporated.

FIG. 2 is a schematic diagram of the avionics system showing selected components in more detail.

Figure 3:
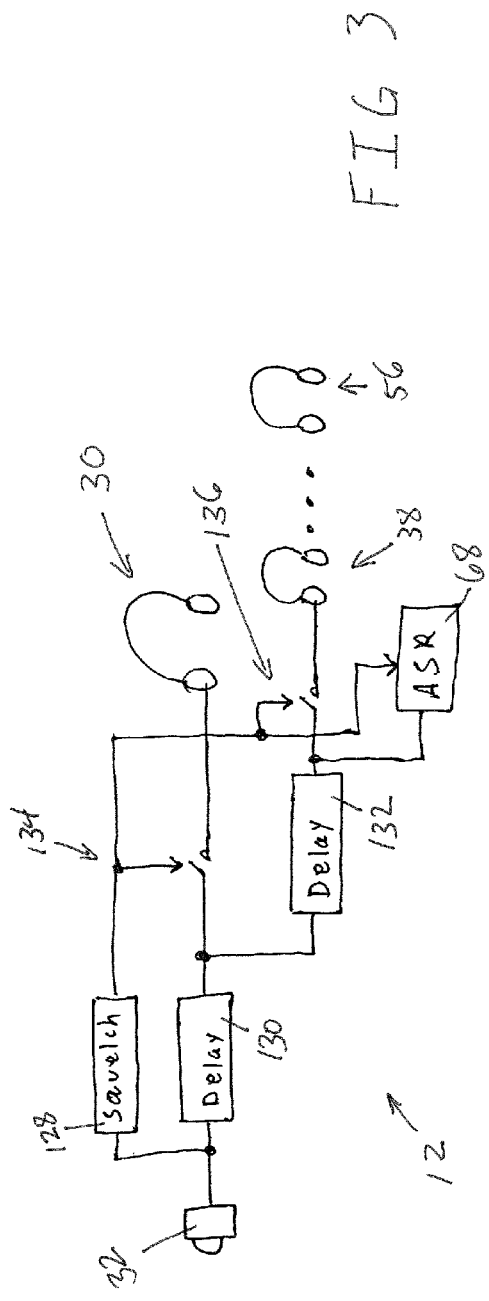
FIG. 3 is a schematic diagram of an audio panel that may be incorporated into the avionics system.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present invention can be implemented in hardware, software, firmware, or a combination thereof. In a preferred embodiment, however, the invention is implemented with an automatic speech recognition (ASR) program and a text-to-speech (TTS) program integrated into an avionics system such as the G1000 integrated avionics system provided by Garmin International, Inc. Certain components of an exemplary control avionics system are broadly referred to by the numeral 10 in FIG. 1. The avionics system equipment and computer programs illustrated and described herein are merely examples of computer equipment and programs that may be used to implement the present invention and may be replaced with other avionics equipment and computer programs without departing from the scope of the present invention.

Referring again to FIG. 1, the avionics system 10 in which the ASR and TTS programs are incorporated may include, among other components, an audio panel 12 and one or more displays 14, 16 and radios 18, 20 coupled with the audio panel 12. The audio panel 12 may serve several stations within an aircraft. For example, the audio panel 12 may have inputs and outputs for a pilot's station referred to by the numeral 22, a co-pilot's station referred to by the numeral 24, a flight attendant's station referred to by the numeral 26, and a passenger's station referred to by the numeral 28. The particular stations illustrated and described herein are examples only; any number of stations may be served by the audio panel.

The pilot's station 22 may include a speaker 30, a microphone 32, a push-to-talk (PTT) switch 34, and a push-to-control (PTC) switch 36. Similarly, the co-pilot's station 24 may include a speaker 38, a microphone 40, a push-to-talk (PTT) switch 42, and a push-to-control (PTC) switch 44. The speakers 30, 38 and microphones 32, 40 are conventional and are preferably combined in aviation headsets. A separate speaker 46 and microphone 48 may be positioned somewhere between the pilot's and co-pilot's stations 22, 24 to permit the pilot and co-pilot to receive and transmit radio communications without their headsets.

The flight attendant's station 26 may also include a speaker 50 and a microphone 52, which may be stand-alone components or integrated into a headset, and a push-to-control (PTC) switch 54. Similarly, the passenger's station 28 may include a speaker 56 and a microphone 58, which may be stand-alone components or integrated into a headset, and a push-to-control (PTC) switch 60.

The displays 14, 16 are preferably large-format LCD displays. The radios 18, 20 are preferably dual integrated radio modules that provide IFR oceanic-approved GPS, VHF navigation with ILS, and VHF communication with transceivers and 8.33 kHz channel spacing.

The audio panel 12 may be coupled with relays, controllers, and/or other equipment to control certain aircraft components broadly referred to by the numeral 62 in FIG. 1. For example, and as explained in more detail below, the avionics system 10 may be used to change a frequency of one of the radios 18, 20; set a heading of the aircraft; set an altitude of the aircraft; set a holding pattern of the aircraft; alert an Expect Further Clearance instruction; configure an auto pilot of the aircraft; set an approach of the aircraft; set an air speed of the aircraft; set or change a flight plan for the aircraft; draw a VFR approach for the aircraft; set a barometric pressure correction setting of the aircraft; change a navigation setting of the aircraft; control the aircraft's engine and/or propeller; and control the lowering and raising of the aircraft's landing gear and/or flaps. These are only examples of aircraft components which may be controlled by the system of the present invention.

The audio panel 12 may also be directly or indirectly coupled with sensors 64 or other devices which sense the state of certain aspects of the aircraft. For example, and as described in more detail below, the avionics system 10 may receive inputs indicative of a position of the aircraft, a heading of the aircraft, an altitude of the aircraft, an attitude of the aircraft, a speed of the aircraft, a flight plan for the aircraft, fuel level, a wind speed experienced by the aircraft, a wind direction and/or angle of attack experienced by the aircraft, a temperature experienced by the aircraft, and a weather condition currently experienced or to be experienced by the aircraft. These are only examples of inputs related to the state of the aircraft.

The audio panel 12 may also be coupled with various databases broadly referred to by the numeral 66 in FIG. 1. The databases may include, for example, the ATIS, clearance, ground and tower frequencies for all known airports; stored waypoints and other navigation information; pre-flight, pre-landing, and pre-taxi checklists and other checklists; stored flight plans; and general information about the aircraft, airports used by the aircraft, hotels and restaurants near the airports, topographic data, obstacle locations and heights, terrain elevation data, airplane configuration settings, pilot profiles, arrival procedures, departure procedures, approach procedures, airport diagrams, runway and taxiway data, weather frequencies, fuel availability and pricing, user defined waypoints, VORs, NDBs, intersections, airways, and airspace boundaries. For example, one or more of the databases 66 may be of the type provided by Jeppesen.

FIG. 2 illustrates the ASR and TTS programs 68, 70 and other components of the audio panel 12 in more detail. The ASR and TTS programs are stored in or on computer-readable medium residing on or accessible by the avionics system 10. For example, the ASR and TTS programs may be stored in memory residing in or accessible by the audio panel 12 or in another component of the avionics system 10. The ASR program 68 can be any conventional speech recognition software such as the VoCon 3200 provided by Nuance. Likewise, the TTS program 70 can be any conventional text-to-speech software such as the Real Speech Solo program provided by Nuance. The computer programs preferably comprise an ordered listing of executable instructions for implementing logical functions in components of the avionics system 10. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium can even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The ASR program 68 is preferably coupled with a grammar definition 72 which stores known commands. The ASR program accesses the grammar definition in order to recognize spoken words or phrases. The ASR program is also coupled with a voice command interpreter 74. The command interpreter is coupled with the displays 14, 16 by lines 76, 78; with the radios 18, 20 by lines 80, 82; with the controlled components 62 by the line 84; and with the sensors 64 and databases 66 by the line 86. The voice command interpreter 74 determines the appropriate action to take based on the words and phrases detected by the ASR program 68, the state of the aircraft as sensed by the sensors 64, and/or information in the aviation databases 66. The voice command interpreter 74 also causes the TTS program 70 to speak words or phrases and controls the display of information on displays 14, 16. The voice command interpreter can also dynamically change the known commands in the grammar definition 72.

As illustrated, the audio panel 12 includes a number of analog to digital converters (ADCs) 88, 90, 92, 94, 96 coupled between the ASR program 68 and the microphones 32, 40, 48, 52, 58 by lines 98, 100, 102, 104, and 106. The microphones convert communications from the pilot, co-pilot, attendant, and passenger into analog electrical signals. The ADCs convert the analog voice signals to a digital representation of the analog signal. The digital representation of the analog signal is then passed to the ASR program.

The audio panel 12 also includes a number of digital to analog converters (DACs) 108, 110, 112, 114, 116 coupled between the TTS program 70 and the speakers 30, 38, 46, 50, 56 by lines 118, 120, 122, 124, and 126. When commanded by the voice command interpreter 74, the TTS 70 generates a digital representation of speech and delivers the digital signals to the DACs. The DACs convert the digital signals to corresponding analog voice signals for driving the speakers.

Operation

The avionics system 10 described and illustrated herein may be used to assist pilots and co-pilots in controlling certain aspects of their aircraft; obtaining useful information about their aircraft; performing operations pursuant to a checklist; receiving status alerts about their aircraft; recognizing relevant communications directed to their aircraft; and; many other functions described herein and equivalents. The system 10 may also be used by aircraft passengers to change between entertainment radios and/or telephones and by flight attendants to obtain useful information and to communicate with the pilots, co-pilots, passengers, and others. Various operational embodiments of the invention are described below; however, the present invention is not limited to these particular exemplary embodiments.

In one embodiment, the avionics system 10 may be used to automatically control a function of an aircraft in response to a pilot's or co-pilot's confirmation of instructions from an external source such as an air traffic control (ATC). For example, the system 10 may be used to automatically change the frequency of one of the radios 18, 20 when a pilot or co-pilot is instructed to do so by ATC. When ATC assigns communication frequencies, pilots or co-pilots commonly read back the frequency assignments to ensure accurate communication. In an inbound radio communication over the radio 18, ATC may say something like, "N123 change to Kansas City Center on 123.45." The pilot responds by pushing the push-to-talk (PTT) switch 34 and then saying, in an outbound radio communication over the radio 18, "Changing to 123.45, N123." Pressing the PTT 34, or any other button or triggering device, triggers the ASR 68 to begin monitoring the outbound communication. Once the PTT 34 is released, the ASR 68 analyzes the pilot's response to recognize words or phrases which may correspond to a control function of the aircraft such as changing the radio frequency. In the present example, the ASR 68 recognizes the pilot's confirmation as a request to change radio 18 to a frequency of 123.45.

The command recognized by the ASR 68 is then passed to the command interpreter 74. After the ASR 68 and command interpreter 74 recognize a frequency change request, the command interpreter may: automatically set the recognized frequency as the communication radio standby frequency; automatically set the active communication radio frequency to the read-back frequency when the transmission is completed; automatically set the communication radio frequency to the read-back frequency if the frequency is consistent with the flight plan or local operating environment; and/or ask for a confirmation. The command interpreter may require confirmation by displaying something like "Change COM 1 to 123.45?" on the display 14 or by directing the TTS program 70 to convert this confirmation to speech and deliver to the pilot via the DAC 108 and speaker 30. The pilot then acknowledges the change of frequency by operating the push-to-control (PTC) button 36 or other device or by saying, "Confirm" or another similar word which would then be recognized by the ASR 68. Once the change of frequency has been acknowledged, the command interpreter changes the frequency of the radio without requiring further action from the pilot or co-pilot. The system may be used in a similar manner to automatically change the heading, altitude, air speed, or any other controllable aspect of the aircraft.

Importantly, the system and method of the present invention permit automatic control of certain aspects of an aircraft without requiring extra steps by the pilot or co-pilot. In the frequency change example above, the radio 18 is controlled as a result of the pilot's normal communications with the ATC. The pilot is not required to perform any additional steps, voice additional commands, operate additional switches, etc., other than the steps he or she would normally perform to confirm a frequency change with the ATC.

As another example, the avionics system 10 may recognize a pilot's or co-pilot's confirmation of a "Clear to Land" communication and then automatically prompt the pilot or co-pilot to begin performing tasks on a pre-landing checklist retrieved from one of the databases 66. Similar examples include the recognition of "Clear to Take-off", "Turning Final", and "Turning Base" transmissions or commands, or other normal radio traffic, to retrieve pre-take-off, pre-landing, or other appropriate checklists.

The system of the present invention may store and use several different checklists for the aircraft. For example, the system may manage emergency checklists, pre-flight checklists, in-flight checklists, landing checklists, post-flight checklists, and any other checklist for the aircraft.

The system may run through the checklists with the pilot and/or co-pilot, or may substantially automatically run through the checklists on its own. For example, when the system detects that the pilot is preparing to land, such as by intercepting an outbound radio transmission, detecting that the aircraft has entered controlled airspace or a landing pattern, or detecting that the aircraft is approaching a destination airport, the system may automatically pull up the pre-landing checklist and begin reading off items and listening for the pilot's "Check". Alternatively, for example, upon recognizing, "Turning Final", the system may automatically run through the pre-landing checklist in the background without interrupting the pilot, to autonomously confirm that everything is properly configured for landing and alert the pilot if anything is amiss, such as landing gear not showing fully down and locked.

The avionics system 10 can also be used by multiple people on the aircraft. For example, the system may monitor selected communications from pilots, co-pilots, attendants and passengers and comply with certain requests from a pilot or co-pilot and different or more limited requests from passengers and/or attendants. The system of the present invention also prioritizes communications so that, for example, commands from pilots take precedence over simultaneous and/or conflicting commands from passengers. The system may also prioritize the level of confirmation required before a requested function is performed so that highly critical functions (lower landing gear) require at least one confirmation, whereas non-critical functions (change an entertainment option) require no confirmation.

In a related embodiment, the avionics system 10 may monitor inbound communications from ATC or other source in an attempt to recognize instructions. If an instruction is recognized, the command interpreter 74 may control related functions in response thereto. For example, the ASR program 68 and command interpreter 74 may monitor one of the radios 18, 20, recognize an ATC request to change frequency or instructions, such as "Change COM 2 to XYZ," and then automatically change the radio frequency. As with the previous embodiment, the command interpreter 74 may first request confirmation before actually performing the recognized function.

The avionics system 10 may also monitor and record a selected duration of all inbound communications and then attempt to recognize data and/or commands in the communications. The duration may be fixed, adjustable, and/or sliding. For example, particularly when expecting the receive ATC clearance instructions, the pilot may instruct the system to record and recognize all audio for the next two minutes. All recognized data and commands are then stored, until some future time, in a scratchpad memory for possible later use by the pilot or co-pilot. Alternatively, the system 10 may monitor all audio and store recognized data and commands in the scratch pad for some duration, such as two minutes, or until a buffer is full, at which point older data and commands drop out of the scratch pad.

The avionics system 10 may also recognize ATC delivered clearance instructions and then automatically program the recognized instructions into a flight management system (FMS) such as an auto-pilot system. The system 10 may also recognize automated terminal information system (ATIS) messages, or AWOS or ASOS messages, and then display recognized information on one of the displays 14, 16, convert it to speech with the TTS 70 and associated speakers, and/or use it to configure the FMS.

The avionics system 10 may also monitor and recognize taxi and airport clearance instructions that are combined with the airport database and GPS position to warn the pilot of unintentional runway incursions or visually confirm to the pilot that he is cleared to take/cross a runway. The system 10 may also monitor and recognize taxi instructions and plot a map on the airport diagram, and then give turn-by-turn directions.

The avionics system 10 may also recognize an incoming approach instruction, or a pilot's or co-pilot's outbound confirmation of such an instruction, and then display a list of possible approaches retrieved from the databases 66. The command interpreter 74 may determine and display an optional approach based on information from the sensors 64 such as wind speed, airport elevation, aircraft altitude, aircraft position, etc.

In another embodiment, the avionics system 10 may be used to automatically control a function of an aircraft by combining ASR commands and information about the state of the aircraft from the sensors 64 and/or information stored in the databases 66. The information about the state of the aircraft may be any of the following: a position of the aircraft; a heading of the aircraft; an altitude of the aircraft; a speed of the aircraft; a flight plan for the aircraft; a fuel level; a wind speed experienced by the aircraft; a wind direction experienced by the aircraft; a temperature experienced by the aircraft; a pressure experienced by the aircraft; a weather condition currently experienced or to be experienced by the aircraft; a phase of flight of the aircraft; a track of the aircraft; a desired track of the aircraft; an altitude pre-select; a height above terrain or obstacles; a position of other aircraft; an auto pilot setting; a trim setting; a flaps setting; a landing gear state; an engine setting; a manifold pressure; an oil temperature; an oil pressure; an exhaust gas temperature; a cylinder head temperature; a state of an electrical system; a vacuum system state; an environmental control system state or setting; an entertainment system setting; an anti-icing setting; and a V-speed setting.

For example, the system 10 may be used to automatically tune one of the radios 18, 20 based on a pilot's or co-pilot's command and the current position of the aircraft. While an aircraft is on the ground, pilots often monitor weather and airport conditions on an ATIS frequency, then attempt to gain IFR clearance on a clearance frequency, then obtain taxi instructions from a ground frequency, and then finally obtain takeoff permission on a tower frequency. Instead of looking up the numeric frequencies for each of these channels for the current airport and then manually switching between the channels, the present invention permits a pilot or co-pilot to merely issue a voice command to automatically tune to a particular frequency. The pilot may push the PTC switch 36 and say something like, "Tune tower". Pressing the PTC 36, or any other button or triggering device, triggers the ASR 68 to begin monitoring the pilot's commands. Once the PTC 36 is released, the ASR 68 attempts to recognize words or phrases of the pilot's command which may correspond to a control function of the aircraft such as changing the radio frequency. In this example, the ASR 68 recognizes the pilot's request to tune one of the radios 18, 20 to the airport tower. The command interpreter 74 then automatically looks up the frequency of the tower for the current airport from one of the databases 66 based on the current position of the aircraft as determined by a Global Positioning Satellite (GPS) receiver. Once the command interpreter 74 has retrieved the tower frequency for the airport, it automatically tunes one of the radios 18, 20 to the relevant tower frequency. The command interpreter 74 may tune either the active or stand-by frequency of either radio.

As with the first exemplary embodiment described above, the command interpreter 74 may also require confirmation before changing the frequency by displaying something like "Tune to tower at XYZ airport?" on the display 14 or using the TTS program 70 to convert this confirmation to speech for delivery to the pilot. The pilot can then acknowledge the change of frequency by operating the PTC button 36 or other device or by saying, "Confirm" or another similar word which would then be recognized by the ASR. Once the pilot has acknowledged the change of frequency, the command interpreter 74 changes the frequency to the appropriate tower frequency. For example, the command interpreter 74 may then change the stand-by frequency to the active frequency and/or may switch to the tuned radio. The system may be used in a similar manner to automatically navigate the aircraft to the nearest airport, find the nearest fuel stop, find the closest airport with a rental car, determine the best altitude based on wind speed, or determine the closest obstacle based on information sensed by a sensor, provided by a database, or otherwise available to the system.

In another embodiment, the avionics system 10 may be used by a pilot, co-pilot, or another person to more quickly and easily check the status of an aircraft by combining ASR commands and TTS readbacks. For example, the system 10 may be used to automatically read-off status information, retrieve a checklist, read-off items from the checklist, and then receive confirmation that functions have been performed in accordance with the checklist. A pilot or co-pilot will often read off items on a checklist while the other performs certain operations in accordance with the checklist and then confirms that the items have been performed. The system 10 may be used to partially automate this process and serve as a "virtual co-pilot". The pilot may push the PTC switch 36 or other switch and say something like, "Pre-flight checklist". Pressing and then releasing the PTC 36 triggers the ASR 68 to attempt to recognize the pilot's request for a pre-flight checklist. Once recognized, the command interpreter 74 retrieves the pre-flight checklist and then instructs the TTS 70 to read off items on the checklist via the speaker 30 or 46. Alternately or additionally, the command interpreter 74 may display items from the checklist on one of the displays 14, 16. After each item in the checklist is read-off or displayed, the pilot responds by saying something like, "Check". The ASR program 68 recognizes the confirmation, and the command interpreter 74 then displays and/or reads off the next item in the checklist. The pilot may also confirm using the PTC switch, such as by pressing the PTC 36 twice in rapid succession.

Before reading off or displaying the requested checklist, the command interpreter 74 may require confirmation by displaying or reading off something like, "Pre-flight checklist?" The pilot acknowledges that the proper checklist was retrieved by operating the PTC switch 36 or by saying, "Confirm". The command interpreter 74 may also dynamically alter the contents of the checklist based on the current state of the aircraft. For example, if a pre-landing checklist is requested and retrieved, and the checklist requires the pilot to lower an aircraft's landing gear, the command interpreter 74 may first acquire the current air speed of the aircraft through one of the sensors 64 and instruct the pilot to reduce the air speed to an acceptable level before lowering the landing gear. The system 10 may perform and or confirm checklist items automatically or semi-automatically. For example, upon reaching an item for lowering the landing gear on a pre-landing check list, the system 10 may confirm that the airspeed is low enough and use the TTS 70 to say something like, "Airspeed is acceptable, shall I lower the landing gear?", and then autonomously lower the landing gear upon recognizing the pilot's, "Check". Alternatively, upon reaching an item for lowering the landing gear on the pre-landing check list, the system 10 may confirm that the airspeed is low enough and use the TTS 70 to say something like, "Airspeed is acceptable, lowering the landing gear", and then autonomously lower the landing gear without requiring further the pilot intervention.

In another embodiment, the avionics system 10 may be used to call-out or display requested data, sensed data, or other information. For example, rather than manually determining the closest airport based on the current position and heading of an aircraft, a pilot or co-pilot can simply push one of the PTC switches 36, 44 or other control device and say something like, "Find nearest airport". Pressing and releasing the PTC triggers the ASR program 68 to recognize the command and triggers the command interpreter 74 to find the closest airport based on sensed information such as the current position, heading, and altitude of the aircraft. The command interpreter 74 then displays the name and coordinates of the closest airport on the display 14 and/or provide this information audibly with the TTS 70 and one of the speakers 30, 38, 46. The system 10 may be used in a similar manner to quickly and easily provide other information such as the position, heading, altitude, and speed of the aircraft as well as weather conditions currently experienced by the aircraft or weather conditions at a selected destination of the aircraft. The system may also be used to automatically provide a call-out when a sensed condition changes. For example, the command interpreter 74 and TTS 70 may call-out an alert when the aircraft descends below a selected threshold altitude or when weather conditions change as sensed by one of the sensors 64. Other TTS alerts and warnings that may be provided by the avionics system include engine fire or other failure warnings and restricted or prohibited airspace warnings.

In another embodiment, the avionics system 10 may be used to monitor ATIS, AWOS, and/or ASOS along a route or near a destination. For example, the system 10 may automatically tune an unused COM or NAV radio to an appropriate frequency and use ASR to recognize information presented by the ATIS, AWOS, or ASOS. The system 10 may capture that information in the background, without forcing the pilot or co-pilot to listen to the inbound radio transmission. The system 10 may then display that information in text and/or graphical form on one of the displays, use the TTS 70 and speakers 30,38,46 to present the information to the pilot, or use that information to configure the FMS.

In another embodiment, the avionics system 10 may be used to alert a pilot or co-pilot of relevant communications. Aircraft radios are often tuned to frequencies which are simultaneously used by multiple aircraft at an airport. The pilot or co-pilot of an aircraft must listen to all of the communications and then respond or comply with instructions that are relevant to his or her particular aircraft. With the present invention, the ASR 68 monitors inbound communications on the radios 18, 20 and then attempts to recognize portions of the inbound communications that identify the aircraft. For example, the ASR may monitor communications from a tower and then recognize the aircraft's tail number in a communication. Once the tail number is recognized, the command interpreter 74 may alert the pilot or co-pilot by directing the TTS 70 and speakers 30, 38 or 46 to provide a speech message such as "Relevant Communication". The command interpreter 74 may also direct one of the displays 14, 16 to provide an alert.

In another embodiment, a pilot or co-pilot may use the ASR to control informational messages which are not typically generated by the avionics system. The TTS is used to generate the messages. The pilot or co-pilot commands or programs the avionics system to generate the messages. For example, the pilot may want to know when a certain altitude, airspeed, or position is reached. Using ASR, the pilot may command "Advise altitude 1,000 feet" or "Advise altitude flight level 120 descending" (ascending and departing would also be options). Other information would include airspeed, position, heading, fuel remaining (in time, lbs, Kg, gallons, liters, etc.), time, fuel burn (above or below a rate) and other aircraft parameters. Similarly, a pilot or co-pilot may use the ASR and TTS in a "Callout" mode to callout airspeed, altitude, fuel flow, etc. The command interpreter would cause a Callout to occur when the callout parameter changed significantly.

In another embodiment, the avionics system 10 can be used as a "virtual instructor" to teach a pilot or co-pilot how to use all functions of the system 10 and/or aircraft. To implement this feature, a pilot or co-pilot can push one of the PTC switches and then say something like "Virtual Instructor". The ASR program 68 and command interpreter 74 recognize this command and retrieve a custom program from one of the databases 66 that provides a tutorial. The command interpreter 74 may display items from the tutorial on one of the displays 14, 16 or may convert the items to speech with the TTS program 70 and one or more of the speakers. The pilot or co-pilot may then perform some function in accordance with the tutorial and say "Next" or "Check" to cause the system to display or speak another item from the tutorial.

In another embodiment, the avionics system 10 can be used as a "virtual examiner" to monitor a pilot's operation of the aircraft. To implement this feature, a pilot or co-pilot can push one of the PTC switches and then say something like "Virtual Examiner". The ASR program 68 and command interpreter 74 recognize this command and retrieve a custom program from one of the databases 66 that provides standards for a check ride, such as would be required to acquire a pilot's license or endorsements or advancements thereto. The command interpreter 74 may display items from the check ride on one of the displays 14, 16 or may convert the items to speech with the TTS program 70 and one or more of the speakers. The pilot may then perform some maneuver in accordance with the check ride, while the system 10 monitors his or her performance, as well as the aircraft's performance. The system 10 can then provide the pilot with feedback as to whether they met the standards and/or constructive criticism to enable to pilot to perform better next time. The pilot or co-pilot can then say "Next" or "Check" to cause the system to display or speak another item from the check ride.

For all of the above-described embodiments, the ASR 68, grammar definition 72, and command interpreter 74 may be programmed to quickly recognize and act upon certain commands frequently used by pilots and co-pilots. For example, the system 10 may quickly recognize the commands: "Mute Terrain" and in response mute a Terrain Awareness and Warning System (TAWS) warning; "Mute Traffic" and in response mute a Traffic Alerting System (TAS) warning; 'set-up ILS" and in response take all the necessary steps to set-up an instrument landing of an aircraft; "Tune Tower" and in response tune one of the radios to a tower frequency; "Emergency Checklist" and then automatically retrieve, read-off, and/or display such a checklist; "Request Weather" and then tune one of the radios to the nearest AWOS, ASOS, or ATIS frequency based on the location of the aircraft as sensed by a GPS device. The ASR 68, grammar definition 72, and command interpreter 74 may also be programmed to recognize a voice command such as "say Again," and in response, call-out or display information a second time. Importantly, the system 10 is set-up to recognize voice commands worded similarly to how pilots or co-pilots normally speak to one another and/or to ATCs and others.

In all of the embodiments, the command interpreter 74 and TTS program 70 may adjust the volume of speech call-outs based on the criticality of the information being called out. For example, the call-out "Danger—Stall Speed" may be at a maximum volume, whereas the call-out "Change Entertainment Setting?" may be at a minimum volume.

Although the invention has been described with reference to the preferred embodiment illustrated in the attached drawing figures, it is noted that equivalents may be employed and substitutions made herein without departing from the scope of the invention as recited in the claims. For example, the outbound and inbound communications which are intercepted and recognized by the avionics system 10 of the present invention are not limited to conversations between the aircraft and ATC, but may also include communications between the aircraft and a dispatch or even communications between the pilots or co-pilots of other aircraft.

In this manner, the system 10 may be used to reduce pilot workload using normal outbound transmissions. For example, the system 10 may change a frequency setting on a COM or NAV radio, set a heading bug or autopilot setting, set a altitude bug or autopilot setting, set a altimeter bug or autopilot setting, or set a airspeed bug or autopilot/engine setting. The system 10 may also configure the FMS with holding pattern confirmed in an outbound transmission, and provide an alert to the pilot if the aircraft is still in the holding pattern after the expect further clearance time has elapsed. The system 10 may also setup and/or modify a VFR or IFR approach, route, or flight plan based on the pilot's read back to ATC. The system 10 may also automatically pull up and go through a checklist, upon recognizing data in an outbound transmission. For example, the system 10 may automatically bring up and/or go through a pre-landing check list or pre-takeoff check list upon recognizing "clear to land" or "clear to take-off", respectively. The system 10 may also respond in this manner to basic position reporting, such as "downwind", "turning base", and/or "turning final". The system 10 may also provide a reminder to report according to read back of an ATC request, or even make the report for the pilot. The system may also be useful on the ground. For example, upon recognizing taxi instructions, the system 10 can display a taxi route for the pilot. This taxi route can incorporate "hold-short" instructions, such that the pilot is warned if they are approaching a hold short point too quickly or approaching a runway after recognizing "hold short" and before recognizing a release or "clear to take off". While the above functionality is expected to work with transmissions to ATC, it can also be utilized with transmissions to a dispatching center and/or other aircraft.

In providing the checklist functionality, the system 10 may simply read them using the TTS 70 and listen for the pilot's confirmation using the ASR program 68. Alternatively, the system 10 may take a more active role by checking one or more of the items itself, either completely in the background or checking and confirming each item to the pilot. For example, when it gets to a landing gear item, the system 10 may confirm, either to itself or to the pilot, that the landing gear it down and locked, thereby essentially removing an item from the checklist. The system 10 may also add items to the checklist, such as asking the pilot to slow the aircraft before deploying the landing gear. The system 10 may also pull up the appropriate checklist with little or no pilot intervention. Furthermore, the system 10 may be able to select which one of a plurality of checklists should be used for any given situation. For example, the system 10 may be able to detect a nature of an emergency and pull up the appropriate emergency checklist to deal with emergencies of that nature.

The system 10 is preferably able to incorporate database and other information, such as aircraft status. For example, the system 10 is able to recognize "tune tower", and then tune the radio to the tower frequency for the airport at the aircraft's current location, or destination if on a flight plan or route. The system 10 can also respond to "turn on runway lights" by looking up the UNICOM frequency and keying the PTT according to the control information stored in the database. The system 10 can be eve smarter and recognize that the aircraft is approaching the airport and automatically turn on the runway lights, if it is after sunset. The system 10 can also respond to commands such as "request weather" to autonomously seek and present weather data from ATIS, AWOS, and/or ASOS. In doing so, the system 10 can change an altimeter setting according to that recognized data and/or display the data graphically or textually. The system 10 can do so in the background, without bothering the pilot or co-pilot. The system 10 may also be used to engine and airframe controls, such as RPM, manifold pressure, mixture, landing gear, and flaps on command, after checking that it is safe to do so and/or after receiving confirmation. The system 10 can also use the TTS 70 to read off fight variables or call-outs, such as airspeed, altitude, vertical speed, heading, RPM, fuel remaining, etc. Such call outs may be configurable through the system 10, such that they can be turned on and off on command. In this manner, the system 10 can be used to control other warning systems, such as a TAWS or TCAS. The system 10 may also be used to find not only the closest airport, but also the closest airport meeting some criteria, such as rental car availability, fuel type available, available services, etc. The system 10 is preferably smart enough to recognize not only data and commands, but also who those commands are from. For example, the system 10 may not respond to commands from a passenger that would impact flight characteristics. Rather, passengers may be only allowed to control in-flight entertainment systems, but still be able to request status information, such as airspeed, altitude, maps, ETA, ETE, etc. In this regard, the system 10 is able to process and respond to simultaneous and differing commands from multiple people and respond differently to those requests. The system 10 can also access database information based on recognized airports or other locations. In this manner, the pilot can extract and use information such as frequencies, pattern altitude, and any other information in the databases 66. Not only can the system 10 respond to a generic command like "tune tower" and determine which tower and frequency based on location, but the system 10 can also respond appropriately to other generic commands, such as "tune center" or "tune FSS", and use the aircraft's location and information in the database to select the appropriate tower, ground, clearance, airport, center, or Flight Service Station frequencies based on location and/or destination.

The system 10 may also be used to synthesize all pilot communications to the passengers, such as the pre-flight briefing, status updates (such as ETA, ETE, airspeed, altitude, etc.), provide a guided tour functionality (such as pointing out the Grand Canyon on the right), warn of turbulent weather (on pilot command or as recognized through background monitoring of ATIS, AWOS, ASOS, etc.)

The system may also provide increased situational awareness to the pilot by warning him or her when the system 10 detects any failure of avionics, engine, or airframe, or approaching or entering restricted airspace (in 3 dimensional space, latitude, longitude, and altitude). The system 10 can also take more positive action, upon detecting a failure or other emergency, such as turning on call-outs when the radio is tuned to 121.5 and otherwise helping the pilot in an emergency, such as by finding the nearest airport, setting waypoints, tuning the radio to an emergency frequency or that of the nearest airport's tower, and well as helping the pilot determine the nature of the emergency.

Rather than just listen to outbound transmissions, the system 10 may also listen to inbound transmissions from ATC. For example, the system may listen for the aircraft's tail number and attempt to recognize information associated with that tail number. The ASR program 68 may use information stored in the databases 66 to aid in that recognition. For example, the ASR program 68 may try to match ATC transmissions with a pre-planed flight plan or route, the aircraft's current location, the aircraft's heading or destination, or anything associated with the aircraft of flight from which certain information might be expected from ATC. The system 10 can decode the ATC instructions and setup the autopilot (or confirm autopilot settings highlighting anything not corresponding to the ATC clearance). Then, the system 10 can use the pilot's outbound read back as a confirmation of data recognized from the inbound ATC instructions. In this manner, the ASR program's 68 speech recognition can be supported, supplemented, or augmented from three sources, inbound ATC transmissions, aircraft status and database information, and the pilot's outbound transmission.

Finally, the ASR program 68 can be used to create text messages from the pilot and/or co-pilot. The system 10 can transmit those text messages to ground stations or other aircraft and receive other text messages from the ground stations or other aircraft. Finally, the TTS 70 read the received text messages to the pilot.

In addition to the PTT switch 34 and PTC switch 36 described above, the system 10 may be operated by a command or keyword. For example, rather than pressing the PTC switch 36, a pilot may simply speak a keyword, such as "computer". While the keyword may be virtually any word, the keyword should be chosen carefully such that it does not come up in normal conversation between the crew and/or passengers. The keyword, however, may be different for each crew member and passenger. For example, the pilot may use a first keyword, while the co-pilot uses a second keyword, different from the first keyword. Additionally, or alternatively, different keywords may be used to initiate different functions. For example, "navigation" may be used as a keyword to access selected navigation functions. As such, the system 10 may ignore that keyword when spoken by a passenger or may allow the passenger to access a limited and/or different set of navigation functions, while allowing the pilot to access a full range of navigation functions upon recognition of the "navigation" keyword from the pilot.

In any case, by limiting keywords to one or some limited number of words, the ASR program 68 may be running in the background continuously, listening only for the keyword(s), thereby operating on a limited grammar. Also, while listening for the keyword, the ASR program 68 may operate with a shorter trailing silence. For example, the ASR program 68 may look for silences after spoken words or phrases, in order to determine when a command or request has been spoken. However, as many commands and requests are comprised of multiple words, and the person speaking may pause slightly before continuing with a command or request, the ASR program 68 must operate with a sufficiently long trailing silence in order to capture an entire command or request. However, until the PTT switch 34 and PTC switch 36 have been activated, the ASR program 68 need not listen for a full set of commands, using a full grammar, and therefore also need not operate with the long trailing silence. Specifically, until the PTT switch 34 and PTC switch 36 have been activated, the ASR program 68 may operate with a relatively short trailing silence and the limited grammar. This reduces the processing requirements of the ASR program 68 and allows the ASR program 68 to more quickly and reliably recognize the keyword.

The short trailing silence and the limited grammar, in turn, allow the ASR program 68 to require a higher confidence level, when running in the background and listening for the keyword. For example, the ASR program 68 preferably makes a confidence level determination whenever attempting to recognize commands, requests, and other words or phrases. A lower confidence level would be more likely to produce errors, while a higher confidence level would be less likely to produce errors, but may be more cumbersome by requiring the person to speak more clearly and/or repeat themselves. Thus, the ASR program 68 must strike a balance. However, when running in the background and using the short trailing silence and the limited grammar, the ASR program can afford to be more selective and require the higher confidence level. This higher confidence level, in turn, prevents accidental full activation of the ASR program 68, and all that that may entail. Once the ASR program 68 does recognize the keyword, then the ASR program 68 preferably reverts to the long trailing silence and full and/or appropriate grammar.

Rather than running in the background continuously, the ASR program 68 may be initiated by the audio panel 12 breaking squelch. Specifically, the ASR program 68 may default to an off state. Then, once the audio panel 12 breaks squelch, the ASR program 68 may be initiated, using the limited grammar and short training silence. Then, once the ASR program 68 recognizes the keyword, the ASR program 68 may switch to an appropriate fuller grammar and the longer trailing silence. As will discussed below, at any time when the PTT switch 34 or the PTC switch 36 is activated, the ASR program 68 may revert to an appropriate fuller grammar and the long trailing silence.

The system 10 preferably provides audio and/or visual feedback when the ASR program 68 recognizes a keyword, command, request, or other instruction or information. For example, the system 10 preferably produces a keyword confirmation through at least the speaker 30 associated with the microphone 32 from which the keyword was received. Likewise, the system 10 preferably produces a command confirmation through at least the speaker 30 associated with the microphone 32 from which the command was received. Finally, the system 10 preferably produces a command failure confirmation through at least the speaker 30 associated with the microphone 32 from which a command was received but not recognized.

Specifically, when the audio panel 12 breaks squelch, the ASR program 68 listens for the keyword, and keeps listening for the keyword until it recognizes the keyword, at which point the system 10 produces the keyword confirmation through at least the speaker 30,38,46,50,56 associated with microphone 32,40,48,52,58 from which the keyword came, at which point the ASR program 68 starts listening for a command. If the ASR program 68 recognizes a command, the system 10 produces the command confirmation. If the ASR program 68 is unable to recognize a command, the system 10 produces the command failure confirmation. Alternatively, when someone presses a PTC switch 36 and the ASR program 68 recognizes a command, the system 10 produces the command confirmation. Finally, when someone presses a PTC switch 36 but the ASR program 68 is unable to recognize a command, the system 10 produces the command failure confirmation.

All three confirmations are preferably noticeable different. Furthermore, the keyword confirmation is preferably noticeably shorter than the other confirmations, in order to smoothly transition between the keyword and the command modes. Of course, there is preferably no keyword failure confirmation. Rather than issuing a keyword failure confirmation each time the ASR program hears but does not recognize something, the ASR program 68 preferably just keeps listening for the keyword. While the feedback is preferably limited to the speaker 30,38,46,50,56 associated with the specific microphone 32,40,48,52,58 from which the input was received, all speaker 30,38,46,50,56 may be provided with the feedback. Such a feature would be helpful in letting others know that someone is attempting to interact with the system 10 and/or help train new users.

The audio panel 12 may be substantially conventional, with the above described features being implemented in other components of the system 10. Alternatively, the audio panel 12 may include Digital Signal Processing (DSP) capability. For example, in addition to generally improving audio quality, DSP capability allows the audio panel 12 of the present invention to address many issues associated with conventional audio panels, such as squelch clipping and background noise.

Squelch clipping is due to an audio panel's delay in determining whether it should break squelch before it actually does. Specifically, an audio panel is typically always receiving some input on one or more microphones. When nobody is trying to communicate that input is considered to be noise and therefore the audio panel does not break squelch and does not pass that input on. When, however, an audio panel receives input of a higher power level or audio volume, above a threshold, the audio panel determines that someone is trying to communicate and reconfigures itself in order to break squelch and pass that input on. It can be appreciated that such determinations and reconfiguration take some amount of time. The result, in more conventional audio panels, is for a initial portions of a word or phrase to be cut off, thereby making effective communication more difficult.

To address squelch clipping, referring now to FIG. 3, the audio panel 12 preferably includes a squelch circuit 128 and one or more delay circuits 130,132. The squelch circuit 128 receives audio through one or more of the microphones 32,40, 48,52,58 and determines whether a person associated therewith is actually attempting to communicate. When the squelch circuit 128 detects an attempt to communicate, an output of the squelch circuit 128 closes switches 134,136 and then provides an input to initiate the ASR program 68 so that the ASR program 68 will begin listening for the keyword, commands, requests, and/or other inputs.

The delay circuits 130,132 receive the input from the microphone 32,40,48,52,58 and delay it before passing it to the speakers 30, 38, 46, 50, 56 and the ASR program 68 through the switches 134,136. This allows the squelch circuit 128 to recognize the attempt to communicate and fully activate the switches 134, 136 before the input gets to the switches, thereby insuring that the entire input is received at the speakers 30,38,46,50,56 and the ASR program 68. Specifically, the delay circuits 130,132 preferably impose a total delay which is longer than the time required to make the above determination and reconfigure the switches 134, 136, thereby effectively eliminating squelch clipping.

The total delay introduced by the delay circuits 130,132 is preferably between approximately 50 ms and 300 ms. In more preferred embodiments, the total delay is between approximately 100 ms and 250 ms. For example, it has been found that delays up to approximately 250 ms do not present noticeable issues, while many squelch circuits would benefit from 100 ms or more delay, to eliminate squelch clipping problems. Thus, the total delay is preferably approximately 250 ms.

As can be seen in FIG. 3, the total delay may be distributed between two or more delay circuits 130,132. For example, in order to avoid confusion or other issues presented by a noticeable delay, a first delay circuit 130 may delay the input for only a relatively short time, such as only 50 ms or less. The first delay circuit's 130 output may be connected to the speaker 30 associated with the same person as the microphone 32 who's input is being received by the audio panel 12. In this manner, the person who is actually talking will experience a minimal and barely noticeable delay, if any at all. As well as the speaker 30 associated with the person who is actually talking, the output of the first delay circuit 130 may be provided to co-pilot's and/or passengers, where squelch clipping is less of a problem.

The first delay circuit's 130 output may also be connected to a second delay circuit 132, the output of which is connected to the speakers 38,46,50,56 and the ASR program 68, as well as the radios 18, 20, thereby minimizing any squelch clipping. It should be appreciated that other listeners and the ASR program 68 would be less bothered by increased delay, than would the person actually talking. So, the additional delay provided by the second delay circuit 132 is virtually transparent to those affected by that delay but helps ensure elimination of any squelch clipping problems. Thus, the delay circuits 130,132 allow the users and other equipment associated with the audio panel 12 to experience different delays, thereby minimizing any issues with the delays while maximizing the efficiency of the communications and the ASR program 68.

Figure 4:
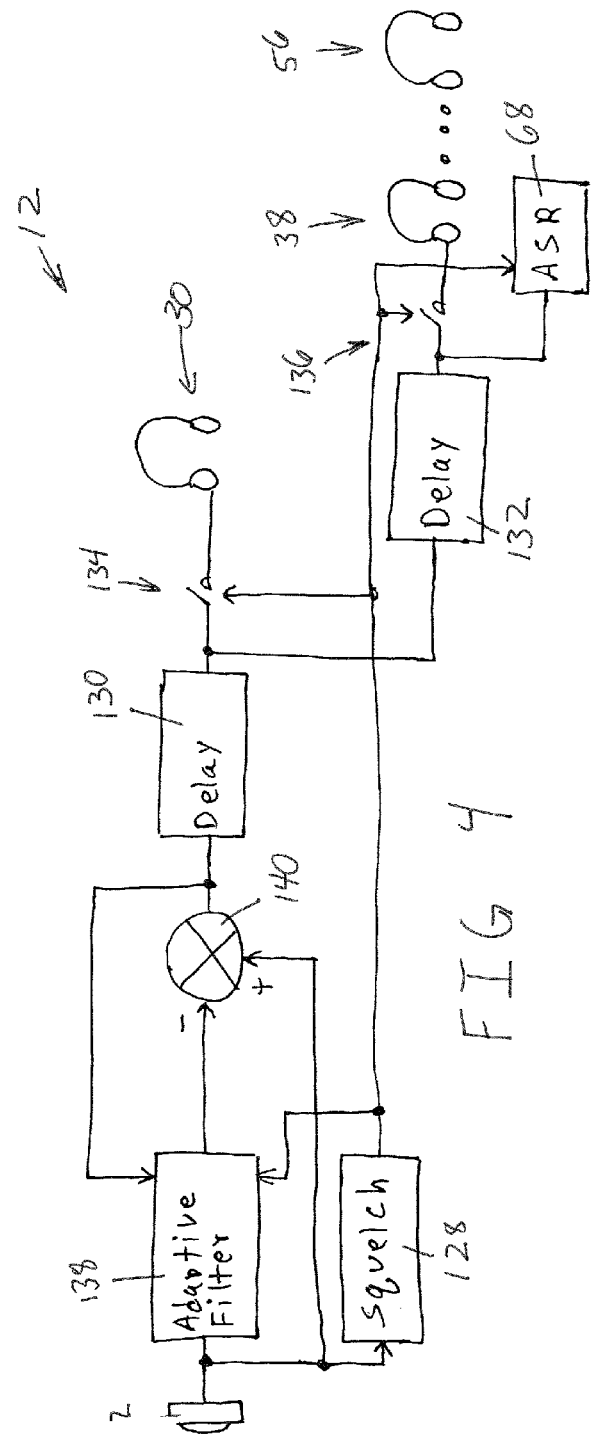
FIG. 4 is a schematic diagram of the audio panel showing more detail.

Now referring to FIG. 4, the DSP capability of the audio panel 12 may also provide noise reduction and/or canceling. Specifically, the audio panel 12 preferably includes an adaptive filter 138 to learn what background noise is present and a summer 140 to subtract out that background noise for each microphone 32,40,48,52,58 and provide feedback to the adaptive filter 138. More specifically, an adaptive filter 138 is preferably listening to each of the microphones 32,40,48,52, 58 while the squelch circuit 128 does not detect an attempt to communicate, and thereby learns what noise each of the microphones 32,40,48,52,58 are experiencing. Then, once the squelch circuit 128 detects an attempt to communicate and breaks squelch, the adaptive filter 138 associated with that microphone 32 stops attempting to learn, and provides what it has learned to the summer 140 for subtraction from the input received at the microphone 32. The adaptive filter 138 is prevented from continuing to learn during a communication so that it does not remove a portion of the communication. Once the squelch circuit 128 no longer detects an attempt to communicate, the adaptive filter 138 returns to its learn mode. In this manner, the audio panel 12 automatically detects and subtracts background noise experienced by each microphone 32,40,48,52,58.

It should be appreciated that the above described improvements to the audio panel 12 make the keyword functionality more feasible. Specifically, the anti-squelch clipping and noise reduction improvements provided by the above described DSP capability help make the ASR program 68 more accurate and reliable, thereby increasing the utility of the keyword functionality.

It should be noted that the PTC switch 36 and the keyword provide access to substantially identical functionality, but simply do so in different ways, as described above. Thus, the keyword allows the system 10 to be more easily integrated into existing systems by avoiding any requirement for PTC switches to be installed. As a result, the system 10 may be integrated into an older aircraft, while requiring relatively little, if any, changes beyond that aircraft's panel mounted equipment.

However, while the keyword functionality and PTC switch 36 functionality may be interchangeable, the preferred implementation provides both. For example, it is anticipated that users will use the keyword described above for simple interaction with the system 10, such as those that require few steps, and the PTC switch 36 for more complex interaction. In any case, the system 10 preferably provides a hierarchy or priority with the PTT switch 34 at the top and given the highest priority, followed by the PTC switch 36 and finally the keyword functionality. For example, if a pilot speaks the keyword, thereby initiating that functionality, and immediately thereafter is required to respond to ATC, the pilot's depression of the PTT switch 34 cancels the keyword functionality and immediately initiates the functionality associated with the PTT switch 34. In this manner, the PTT switch 34 can override the keyword functionality and the functionality associated with the PTC switch 36. Likewise, the PTC switch 36 can override the functionality associated with the keyword.

The invention claimed is:

1. A method of controlling functions of an aircraft, the method comprising the steps of:
   initializing a speech recognition program;
   receiving a keyword from a person on the aircraft;
   providing a keyword confirmation if the keyword is recognized;
   receiving a command from the person which relates to a request for a function;
   using the speech recognition program to analyze at least a portion of the command to recognize a word or phrase corresponding to the function;
   providing a command confirmation if the command is recognized; and
   automatically performing the function.

2. The method as set forth in claim 1, wherein the person is a pilot of the aircraft and the function is selected from the group consisting of: changing a frequency of a radio on the aircraft; setting a heading of the aircraft; setting an altitude of the aircraft; setting a holding pattern of the aircraft; alerting an Expect Further Clearance instruction; configuring an auto pilot of the aircraft; performing a checklist; setting an altimeter setting of the aircraft; setting an approach of the aircraft; setting an air speed of the aircraft; setting or changing a flight plan for the aircraft; drawing a VFR approach of the aircraft; setting a barometric pressure correction setting of the aircraft; and changing a navigation setting of the aircraft.

3. The method as set forth in claim 1, further including the step of prompting the person to confirm that the word or phrase recognized by the speech recognition program does in fact correspond to the desired function.

4. The method as set forth in claim 3, wherein the prompting step includes the steps of converting the recognized word or phrase to speech with a text-to-speech program and delivering the speech to the person.

5. The method as set forth in claim 1, wherein the keyword and command are received with a microphone positioned in a cockpit of the aircraft.

6. The method as set forth in claim 5, wherein the providing steps are performed with a speaker associated specifically with the microphone.

7. The method as set forth in claim 6, wherein the microphone and speaker are part of a headset worn by a pilot of the aircraft.

8. The method as set forth in claim 1, wherein the initializing step is triggered by an audio panel of the aircraft breaking squelch.

9. The method as set forth in claim 8, wherein the audio panel delays the keyword while the audio panel is in the act of breaking squelch.

10. The method as set forth in claim 8, wherein the audio panel monitors a background noise before breaking squelch and subtracts the background noise after breaking squelch.

11. The method as set forth in claim 1, wherein before receiving the keyword, the speech recognition program operates with a limited grammar.

12. The method as set forth in claim 11, wherein after receiving the keyword and before receiving the command, the speech recognition program switches from the limited grammar to a fuller grammar.

13. The method as set forth in claim 1, wherein before receiving the keyword, the speech recognition program operates with a short trailing silence.

14. The method as set forth in claim 13, wherein after receiving the keyword and before receiving the command, the speech recognition program switches from the short trailing silence to a long trailing silence.

15. A method of controlling functions of an aircraft, the method comprising the steps of:
   initializing a speech recognition program with a first grammar and a first trailing silence;
   receiving a keyword from a person on the aircraft;
   providing a keyword confirmation and reconfiguring the speech recognition program to operate with a second grammar and a second trailing silence if the keyword is recognized;
   receiving a command from the person which relates to a request for a function;
   using the speech recognition program to analyze at least a portion of the command to recognize a word or phrase corresponding to the function;
   providing a command confirmation if the command is recognized; and
   automatically performing the function.

16. The method as set forth in claim 15, wherein the person is a pilot of the aircraft and the function is selected from the group consisting of: changing a frequency of a radio on the aircraft; setting a heading of the aircraft; setting an altitude of the aircraft; setting a holding pattern of the aircraft; alerting an Expect Further Clearance instruction; configuring an auto pilot of the aircraft; performing a checklist; setting an altimeter setting of the aircraft; setting an approach of the aircraft; setting an air speed of the aircraft; setting or changing a flight plan for the aircraft; drawing a VFR approach of the aircraft; setting a barometric pressure correction setting of the aircraft; and changing a navigation setting of the aircraft.

17. The method as set forth in claim 15, further including the step of prompting the person to confirm that the word or phrase recognized by the speech recognition program does in fact correspond to the desired function.

18. The method as set forth in claim 3, wherein the prompting step includes the steps of converting the recognized word or phrase to speech with a text-to-speech program and delivering the speech to the person.

19. The method as set forth in claim 15, wherein the initializing step is triggered by an audio panel of the aircraft breaking squelch.

20. The method as set forth in claim 19, wherein the audio panel
   before breaking squelch, monitors a background noise, and
   after breaking squelch, subtracts the background noise and delays the keyword.

* * * * *